(12) United States Patent
Crowell et al.

(10) Patent No.: US 7,559,461 B2
(45) Date of Patent: Jul. 14, 2009

(54) ATM SYSTEMS AND METHODS FOR CASHING CHECKS

(75) Inventors: Donald R. Crowell, Glassboro, NJ (US); Richard A. Sheeran, Somerdale, NJ (US); Bryan Anthony Warburton, Atglen, PA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 547 days.

(21) Appl. No.: 11/421,839

(22) Filed: Jun. 2, 2006

(65) Prior Publication Data

US 2007/0278286 A1 Dec. 6, 2007

(51) Int. Cl.
*G06F 17/60* (2006.01)
(52) U.S. Cl. .................. 235/379; 235/380; 235/381; 705/17; 705/39; 705/42; 455/418; 455/557
(58) Field of Classification Search ......... 235/379–381; 705/17, 39, 42; 455/418, 557
See application file for complete search history.

(56) References Cited

U.S. PATENT DOCUMENTS

| | | | | |
|---|---|---|---|---|
| 5,302,811 A | * | 4/1994 | Fukatsu | ............... 235/380 |
| 7,136,623 B2 | * | 11/2006 | Fare et al. | ............... 455/41.2 |
| 2003/0094402 A1 | * | 5/2003 | Seo et al. | ............... 209/534 |
| 2003/0101096 A1 | * | 5/2003 | Suzuki et al. | ............... 705/17 |
| 2003/0178281 A1 | * | 9/2003 | Goto et al. | ............... 194/206 |
| 2005/0182710 A1 | * | 8/2005 | Andersson et al. | ............... 705/39 |
| 2006/0038004 A1 | * | 2/2006 | Rielly et al. | ............... 235/379 |
| 2006/0249568 A1 | * | 11/2006 | Scanlon | ............... 235/379 |

* cited by examiner

*Primary Examiner*—Allyson N Trail
(74) *Attorney, Agent, or Firm*—Townsend and Townsend and Crew LLP (57) ABSTRACT

Various techniques are provided for dispensing cash from automated teller or similar cash dispensing machines where such machines do not contain or are otherwise unable to dispense coins or certain bill denominations. Such features may be offered in combination with a request to cash a negotiable instrument, such as a check, where some or all of the amount is to be received in cash or deposited into an account. In one particular method, an automated teller machine (ATM) includes a display screen, a data entry device, a receipt printer, a bill dispenser and a reader. According to the method, information is read from a negotiable instrument using the reader. A face amount of the negotiable instrument is received at the ATM from the data entry device. The display screen is employed to display a dispense amount in bills that the ATM is capable of dispensing along with a deposit account where the remaining funds may be deposited. The user may then enter a confirmation using the data entry device to dispense the bills and to deposit the remaining funds in the deposit account. The bill dispenser may dispense the bills, and an approval may be sent to deposit the funds into the deposit account.

33 Claims, 4 Drawing Sheets

ATM SYSTEMS AND METHODS FOR CASHING CHECKS

CROSS-REFERENCES TO RELATED APPLICATIONS

This application is related to U.S. application Ser. No. 11/388,539, filed Mar. 23, 2006, which is a continuation of U.S. application Ser. No. 11/241,810, filed Sep. 29, 2005. This application is also related to U.S. application Ser. No. 10/225,410, filed Aug. 20, 2002. The complete disclosures of all these applications are herein incorporated by reference.

BACKGROUND OF THE INVENTION

This invention relates generally to the field of cashing negotiable instruments, such as checks. More particularly, the invention relates to the cashing of negotiable instruments at automated teller machines (ATMs) or similar machines which dispense cash.

ATMs were introduced, in part, to dispense cash to bank customers, thus providing convenient locations for performing limited banking functions. Over time, these functions have increased. For example, some ATMs now offer check cashing features where a user can insert a check into the ATM and receive cash back for the face amount of the check.

One drawback with such ATMs is that they must be capable of holding coins. This is because many checks are written to include both dollars and cents, and to properly cash the check, the ATM must be capable of dispensing both bills and coins. As such, many ATMs are unsuitable for being used to cash checks. Further, even with ATMs which dispense coins, a problem occurs when such ATMs run out of coins or certain bills, thus being unable to dispense the face amount of the check in cash. In such cases, the ATM check cashing feature will need to be disabled.

BRIEF SUMMARY OF THE INVENTION

The invention provides various techniques for dispensing cash from automated teller or similar cash dispensing machines where such machines do not contain or are otherwise unable to dispense coins or certain bill denominations. Such features may be offered in combination with a request to cash a negotiable instrument, such as a check, where some or all of the amount is to be received in cash or deposited into an account. In one particular method, the invention utilizes an automated teller machine (ATM) that includes a display screen, a data entry device, a receipt printer, a bill dispenser and a reader. According to the method, information is read from a negotiable instrument using the reader. A face amount of the negotiable instrument is received at the ATM from the data entry device. The display screen is employed to display a dispense amount in bills that the ATM is capable of dispensing along with a deposit account where the remaining funds may be deposited. The user may then enter a confirmation using the data entry device to dispense the bills and to deposit the remaining funds in the deposit account. The bill dispenser may dispense the bills, and an approval may be sent from the ATM to a host computer system to deposit the funds into the deposit account.

In one aspect, the dispense amount may be determined based at least in part on the lowest denomination of bill that the ATM is able to dispense. Also, the display screen may be used to display a message indicating the lowest denomination bill offered by the ATM along with a message that any excess funds will be deposited into the deposit account. In some cases, a list of possible deposit accounts may be offered.

In another aspect, a receipt may be printed indicating the amount of cash dispensed and the amount deposited into the deposit account. In a further aspect, the information read from the negotiable instrument is a MICR line having payor account information.

Another embodiment of the invention provides a method for cashing a negotiable instrument at an automated teller machine (ATM) which communicates with a host computer system. As part of the method, information is read from a negotiable instrument using the reader. A requested cash back amount from the negotiable instrument is entered into the ATM using the data entry device. The requested cash back amount and the information read from the negotiable instrument is transmitted to the host computer system. In turn, the host determines whether the ATM is able to dispense the requested cash back amount. If not, the host computer system determines which bill denominations that the ATM is able to dispense and transmits to the ATM a dispense amount that the ATM is able to dispense. The dispense amount includes both bills and a deposit amount for the remainder of the requested cash back amount. This information is also displayed on the display screen. A confirmation may be input using the data entry device to dispense the bills and to deposit the deposit amount in the deposit account. The bills may then be dispensed and an approval transmitted from the ATM to the host computer system to deposit the funds into the deposit account.

In one aspect, the requested cash back amount is the face amount stated on the negotiable instrument. However, in some cases, the requested cash back amount could be less than the face amount.

In another particular aspect, the ATM includes a coin dispenser that is unable to dispense coins. In such cases, the host computer system is configured to determine the dispense amount based on the inability to dispense coins. In other cases, the ATM is configured to dispense only bills. In these cases, the host computer system is configured to determine the dispense amount based on bill denominations that the ATM is capable of dispensing. In one option, the dispense amount may be determined based at least in part on the lowest denomination of bill held by the ATM.

In one particular configuration, if the ATM is not able to dispense the requested cash back amount, the negotiable instrument cashing transaction may be denied. Instead, the transaction is converted into a deposit transaction with a cash back transaction.

In some cases, the dispense amount may be based on a next highest denomination able for dispensing. Also, the display screen may display a message indicating the lowest denomination bill offered by the ATM along with a message that any excess finds will be deposited into the deposit account. Further, a receipt may be printed indicating the amount of cash dispensed and the amount deposited into the deposit account. In still another aspect, the host computer system may store data on requested cash back amount along with the bills actually dispensed. In this way, various statistical data may be maintained.

The invention further provides an exemplary automated teller machine (ATM) that is configured to provide a cash payment based on a negotiable instrument. The ATM comprises a housing, a processor enclosed within the housing and a reader electrically coupled to the processor that is configured to read information from a negotiable instrument. The ATM also includes a data entry device that is electrically coupled to the processor. The data entry device is configured to receive a face amount of the negotiable instrument. A display screen is coupled to the housing and is configured to display a dispense amount in bills that the ATM is capable of dispensing along with a deposit account where the remaining funds may be deposited. The data entry device is further configured to receive a confirmation to dispense the bills and to deposit the remaining funds in the deposit account. A bill dispenser is used to dispense the bills from the ATM. A communications device is configured to transmit an approval from the ATM to a host computer system to deposit the funds into the deposit account.

In one aspect, the dispense amount is determined based at least in part on the lowest denomination of bill that the ATM is able to dispense. Also, the display screen may display a message indicating the lowest denomination bill offered by the ATM along with a message that any excess funds will be deposited into the deposit account. Optionally, the display screen may display various options for depositing the funds.

In a further embodiment, the invention provides a system for cashing a negotiable instrument. The system comprises an automated teller machine (ATM) comprising a display screen, a data entry device, a receipt printer, a bill dispenser and a reader. The system also includes a host computer system capable of communicating with the ATM. The ATM is configured to read information from a negotiable instrument using the reader, to receive a requested cash back amount from the data entry device, and to transmit the requested cash back amount and the information read from the negotiable instrument to the host computer system. Also, the host computer system is configured to determine whether the ATM is able to dispense the requested cash back amount, and, if the ATM is unable to dispense the requested cash back amount in cash, to determine which bill denominations that the ATM is able to dispense. The host is further configured to transmit to the ATM a dispense amount that the ATM is able to dispense in bills and a deposit amount for the remainder of the requested cash back amount. The ATM is further configured to display on the display screen the dispense amount along with a deposit account where the deposit amount may be deposited, to receive a confirmation from the data entry device to dispense the bills and to deposit the deposit amount in the deposit account, to dispense the bills from the ATM using the bill dispenser, and to transmit an approval from the ATM to the host computer system to deposit the funds into the deposit account.

In one optional aspect, the ATM includes a coin dispenser that is unable to dispense coins. In such cases, the host computer system is configured to determine the dispense amount based on the inability to dispense coins. In another option, the ATM is configured to dispense only bills, and the host computer system is configured to determine the dispense amount based on bill denominations that the ATM is capable of dispensing.

DETAILED DESCRIPTION OF THE INVENTION

The invention provides various machines, systems and methods for cashing negotiable instruments. Such negotiable instruments can include personal checks, official checks, money orders, and the like. One feature of the invention is that such negotiable instruments may be cashed using a machine, without the need for human assistance. In other words, a holder of the negotiable instrument may simply provide the negotiable instrument to the machine which provides a payout in cash. According to one aspect of the invention, accommodations may be made in cases where the machine is incapable of dispensing coins and/or certain bills. For example, the machine used to cash the negotiable instrument may not include a supply of coins. Alternatively, the machine may be out of certain coins and/or bills, thereby rendering it impossible to provide the holder of the negotiable instrument with the full amount in cash. To do so, the holder of the negotiable instrument is provided with an option of receiving a portion of the payout in cash while being able to deposit the remainder of the funds in some type of account.

A variety of schemes may be used to determine how much the machine should pay out in cash and/or deposit into an account. Merely by way of example, an algorithm may be performed to determine the maximum amount of cash that may be dispensed based on the coins and/or bills held in the machine. The remainder may be deposited into the account. As another option, the machine may display different amounts of cash that may be dispensed, while permitting the user to select one of the options, with the remainder being deposited into the account. Still another algorithm determines the lowest possible coin and/or bill that the machine is capable of dispensing and then determining the amount of cash that the machine is able to dispense using that particular denomination. However, it will be appreciated that other schemes could be employed. Just as an example, the algorithm may determine the fewest number of bills and/or coins, while providing the rest into a deposit account.

One particular advantage of such a system is that a cash dispensing machine which does not normally include coins may still be used to cash negotiable instruments without requiring an expensive retrofit to provide the machine with coin dispensing capabilities. Further, if the machine runs out of certain coins and/or bills, or partially malfunctions, the machine may still be used to provide a negotiable instrument cashing function. Another particular advantage is that this feature may be used when the holder of the negotiable instrument requires a check cashing function or primarily wants to deposit some of the funds into an account while receiving only a portion of the face amount in cash.

Such features may be provided using a variety of machines that are capable of giving cash back. As is known in the art, such machines include automatic teller machines (ATMs), kiosks, point-of-sale devices, and the like. In addition to being able to dispense cash, such machines may also be configured to be coupled to a network so that the machine can communicate with a back end host. Functions which may be performed at the host (although some of these may also be done at the cash dispensing machine) include verifying whether good funds are associated with the negotiable instrument, determining coins and/or bills that the machine is capable of dispensing, determining which accounts to deposit any excess funds, providing any statistical or reporting capabilities, or the like.

Also, any excess funds may be deposited into a wide variety of accounts. These can include checking accounts, savings accounts, stored value accounts, or the like. These accounts may be tied to an ATM network, or other type of network, such as other debit networks, credit networks, stored value networks, or the like. In some cases, the user may be provided with a single account in which to deposit the funds, which may be the user's checking account. However, in other cases the user may be provided with a list of accounts that the user has opened. The user may then select one or more of the accounts to deposit the excess funds. In another option, the user may pre-register an account which will appear as a default account whenever the user requests cash back.

Figure 1:
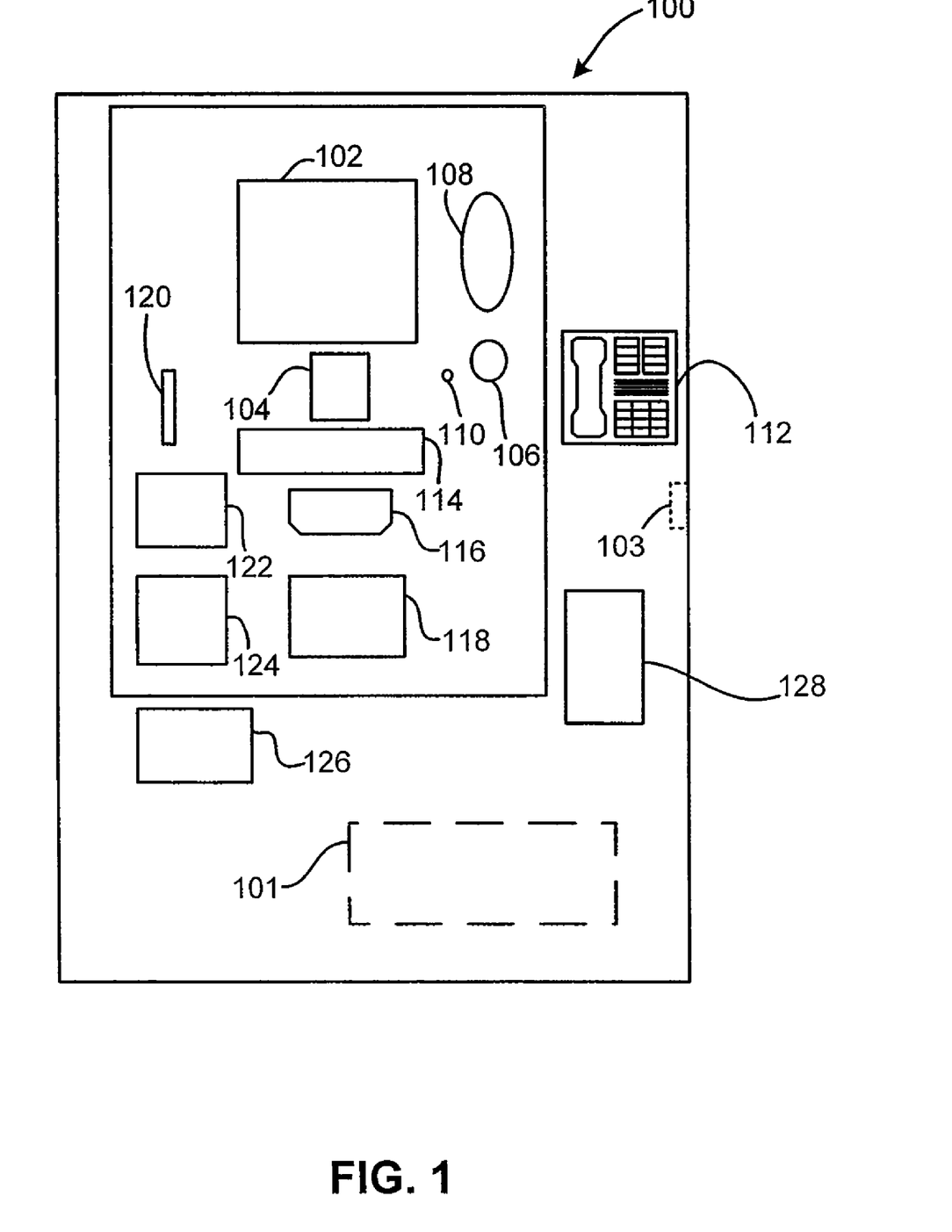
FIG. 1 is a schematic diagram of a cash dispensing machine according to one embodiment of the invention.

FIG. 1 illustrates one example of a kiosk 100 that may be used to provide cash back when cashing and/or depositing negotiable instruments. The kiosk 100 is presented as an illustration only, and this example should not be considered limiting. In light of the disclosure herein, many other examples of kiosks according to the present invention are apparent to those skilled in the art, as well as other types of cash-dispensing machines.

Kiosks, such as the multi-purpose kiosk 100, may be located wherever customers might obtain access to them. For example, shopping malls, airports, postal facilities, banks and the like, would all be ideal locations for such kiosks. Kiosks may be connected to a network, such as a financial transaction network, via a wire line or wireless connection using an output communications interface 103. A computing device, such as a central processor 101, controls many of the functions of the kiosk.

The kiosk 100 includes a monitor 102 and a keypad 104. The monitor may include a touch screen that allows users to enter information by touching buttons displayed on the screen. Alternatively or additionally, users may enter information using a keypad 104. The keypad 104 may contain both numbers and letters. Additionally, the keypad 104 may include special purpose buttons for selecting functions according to the invention.

The kiosk 100 also includes a camera 106, a speaker 108, and a microphone 110. The camera 106, speaker 108, and microphone 110 may be used to interact with a customer service representative, among other functions. The customer service representative's image may appear on the monitor 102. Alternatively or additionally, a telephone 112 may be used to interact with the customer service representative.

The kiosk 100 also includes a cash dispenser 114 and a coin dispenser 116. A cash/check scanner 118 is provided for receiving funds in the form of currency or certain types of paper instruments. For example, an optical character reader, such ad a MICR reader, may be used to read account information from checks, money orders, and other negotiable instruments. In addition, a card reader 120, such as a Hypercom terminal, is provided for using any of a wide variety of currency exchange media. For example, the card reader 120 may read magnetic strips, such as those commonly found on credit and debit cards, customer loyalty cards, value cards, and the like. The card reader 120 may also read "chips," such as those associated with certain types of "smart cards." The card reader 120 may also read other types of currency exchange media, including infrared and radio frequency devices. For instance, a customer may be able to "beam" account information into the card reader 120 using an infrared transmitter associated with a PDA (personal digital assistant). Thus, reader 120 may perform any of a wide variety of reading functions. Additionally, the card reader 120 may be able to write information to value cards, and the like. A transmitter may also be used to directly "beam" receipt information to a PDA.

The kiosk 100 also includes a receipt printer 122, a money order printer 124, and a cash card dispenser 126. The receipt printer 122 provides users with receipts of transactions and other information, as will be explained in more detail hereinafter. The money order printer 124 prints money orders in amounts requested by users, as will be described. Example of money order printers are described in more detail in U.S. patent application Ser. No. 6,015,087, entitled "Apparatus and Method For Issuing Documents Of Value," which patent is incorporated herein by reference in its entirety, and in U.S. patent application Ser. No. 09/751,126, entitled "Money Order Encashment Via The FDX 400," filed on Dec. 28, 2000, by Earney Stoutenburg et al., which application is incorporated herein by reference. The cash card dispenser 126 dispenses cash cards, or other value cards, that may store value or store account information that users may use to access currency or other value. The cash card dispenser 126 may be used in combination with the card reader 120, wherein the cash card dispenser 126 dispenses value cards and the card reader 120 writes information to the value cards. The kiosk 100 may also contain holders such as marketing material holder 128 for educating users regarding the use of the kiosk 100, or to provide users with supplies needed in the course of conducting transactions using the kiosk 100.

Although shown with both a cash dispenser 114 and a coin dispenser 116, it be appreciated that in some cases kiosk 100 may not include a coin dispenser. In such cases, kiosk 100 may be configured to provide the holder of the negotiable instrument with the option of receiving a portion of a negotiable instrument in cash, with the remainder placed into a deposit account. A similar option may be provided if cash dispenser 114 malfunctions and/or is out of certain bills. In such cases, monitor 102 may be employed to provide information to the user regarding various options for cashing the negotiable instrument. For example, monitor 102 may display a message indicating that all of the finds may not be dispensed in cash and to ask the user if the user wishes to proceed by receiving part of the funds in cash and part into a deposit account. The user may enter the input using monitor 102 and/or keypad 104. Continuing on with the transaction, monitor 102 may be employed to display the amount which will be dispensed in cash and the amount which will be deposited into the account, and then to permit the user to confirm that the transaction is to proceed.

Card reader 120 is employed to read the user's bank card, as is known in the art. This is employed to identify the user as well as to gain access to the functions of kiosk 100. Further, when part of the funds are to be deposited into an account, the account suggested by kiosk 100 (and displayed on monitor 102) may be one that is tied to the user's card which is read by card reader 120. For example, if a user inserts a traditional ATM or debit card, the user may be provided with the option of depositing the funds into a checking and/or savings account that is tied to that particular card. As previously described, the user could also pre-register other accounts so that different options could be provided for depositing the excess funds.

Cash/check scanner 118 may be employed to read information off of the MICR line of the negotiable instrument and/or to read a face amount of the negotiable instrument. This in turn may be employed to perform various checks to make sure that the check is valid. Also, this can be done so that the negotiable instrument may be pre-registered with the authorizer to allow the authorizer to apply limits directly against a registered negotiable instrument cashing limit that may be significantly higher than a standard check cashing limit or the customer withdrawal limits.

Central processor 101 of kiosk 100 may assist in performing the negotiable instrument cashing functions. For example, the processor 101 may be employed to operate one or more algorithms to determine if the kiosk is capable of dispensing all of the funds in cash. If not, the processor 101 may be configured to run an algorithm to determine how much should be dispensed in cash and how much should be placed into a deposit account. As another option, kiosk 100 may use interface 103 to communicate over a network (such as an ATM network) to perform some of the functions. In this way, information obtained from the negotiable instrument and the user may be transmitted back to a host system which may be used to poll the kiosk 100 to determine if it is incapable of dispensing the funds and to run any algorithms to determine the amount of funds that may be dispensed in cash, with the remainder to be placed into the deposit account.

Figure 2:
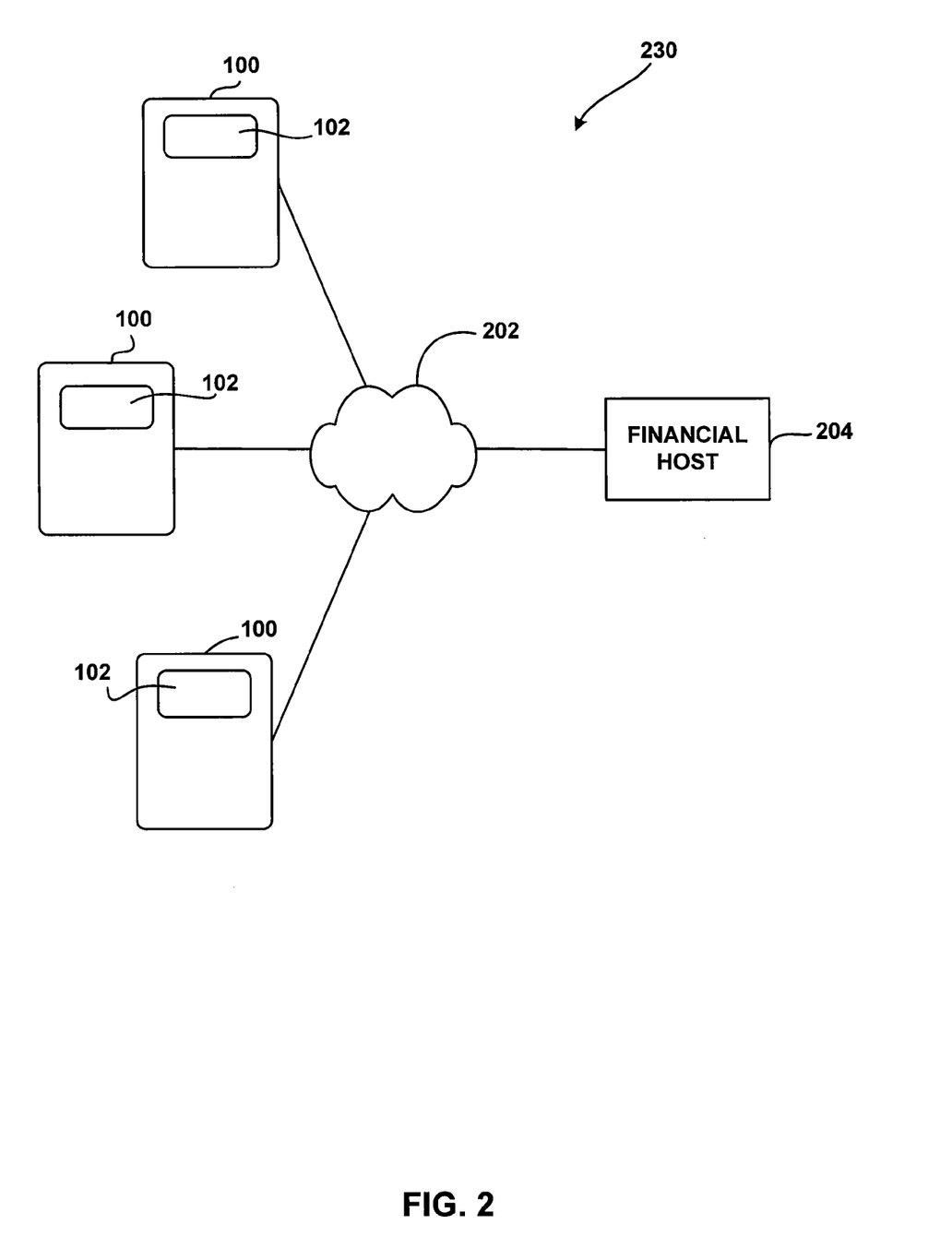
FIG. 2 is a schematic diagram of a system for cashing negotiable instruments according to one embodiment of the invention.

FIG. 2 illustrates a system 200 that may be employed to assist in the negotiable instrument cashing functionality described herein. Conveniently, system 200 may include multiple kiosks 100 which may be similar to those previously described. However, it will be appreciated that other types of negotiable instrument cashing machines may be provided. Kiosks 100 communicate over a network 202 with a financial host 204. Network 202 may be any type of recognized network, such as an ATM network, credit card network, public network, private network, cellular network, or the like.

One particular function of financial host 204 is to receive requests from kiosk 100 relating to the need to cash a negotiable instrument. In such cases, financial host 204 may poll the particular kiosk 100 to determine if it is able to dispense the face value of the negotiable instrument. If not, host 204 may transmit a message to kiosk 100 which may be displayed on display screen 102 indicating that kiosk 100 is unable to perform the requested function. In such cases, the user may be provided with an option to receive a portion of the funds in cash and a portion deposited into the user's deposit account. If the user wishes to continue with this option, host 204 may perform an algorithm to determine an amount that kiosk 100 is able to dispense in cash and to determine one more deposit accounts into which the remaining funds may be deposited. This information may be displayed on display screen 102 to permit the user to confirm that they wish to proceed with the transaction. If so, kiosk 100 dispenses the funds in cash and then proceeds to take necessary steps in order to deposit the excess funds into the user's deposit account. Also, host 204 may send information back to kiosk 100 to permit a receipt to be generated and/or printed confirming the amount of cash dispensed and where the excess funds are to be deposited.

Figure 3:
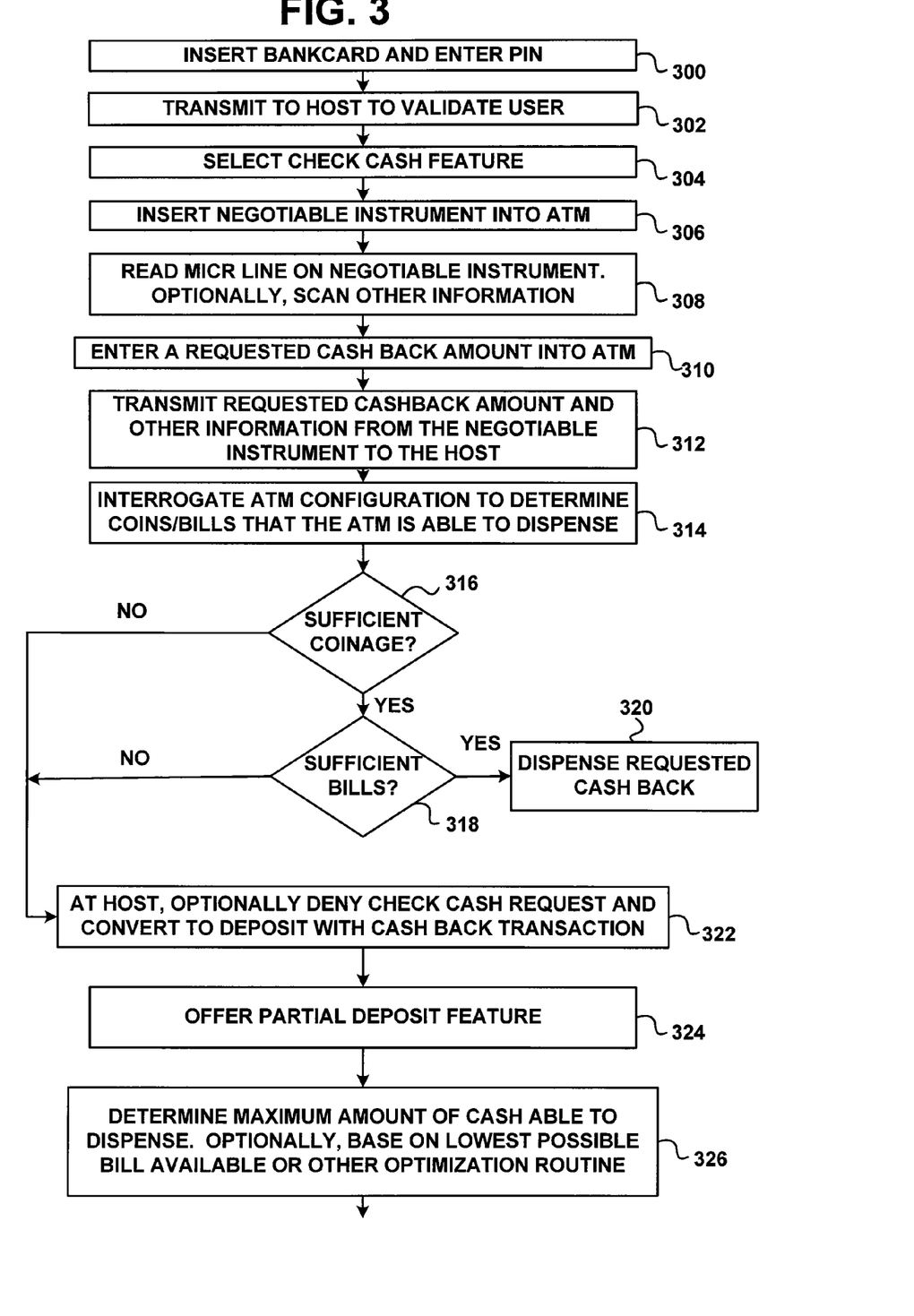
FIG. 3 illustrates one method for cashing negotiable instruments according to the invention.

Referring now to FIG. 3, one method for cashing a negotiable instrument will be described. In step 300, the user approaches a financial machine and inserts his or her bank card. Optionally, the user may also enter his or her PIN. This information is transmitted to a host which validates the user as shown in step 302. Once validated, the user may perform various functions using the machine, such as balance inquiries, account transfers, withdrawals, and the like as is known in the art. One function (as shown in step 304) provides for cashing a negotiable instrument. If this feature is selected, the user may insert the negotiable instrument as shown in step 306. The machine may read a MICR line (or other information) from the negotiable instrument as shown in step 308. This information may be employed to validate the negotiable instrument and/or to alter various check cashing and/or withdrawal limits that may be employed by the financial institution.

In step 310, the user enters a requested cash back amount into the ATM. In some cases, this may be fall amount of the negotiable instrument or a portion of the negotiable instrument. In step 312, the requested cash back amount is transmitted, along with other information from the negotiable instrument, to the host. In step 314, the host interrogates the ATM configuration data to determine the coins and/or bills that the ATM is able to dispense. For example, in step 316 the ATM may be evaluated to determine if it has sufficient coinage to meet the request. If there is sufficient coinage, the process may proceed to step 318 where an inquiry is performed to see if the ATM has sufficient bills to meet the request. If both conditions are met, the process proceeds to step 320 where the requested cash back amount is dispensed. However, if there is insufficient coinage and/or bills, the process proceeds to step 322 where a process begins for providing a partial cash back payment with the remainder deposited into a deposit account. Optionally, the host may be deny the check cash request and convert it into a deposit transaction with a cash back amount. However, it will be appreciated that the host could simply be configured to continue the transaction with a check cash request along with a deposit transaction. In step 324, the user is provided with a partial deposit feature. In other words, the user is given the option of receiving part of the requested amount in cash, with the remainder being deposited into one or more deposit accounts. In step 326, a maximum amount of cash that the machine is able to dispense is determined. Optionally, this may be based on the lowest possible bill available or other optimization routine.

In step 328, the host transmits to the ATM the lowest possible bill that it is capable of dispensing. The user is then asked at the ATM if they wish to receive the cash in the lowest possible bill plus the remainder in a deposit account as shown in step 330. If the user wishes to continue, the ATM may display the dispense amount and the deposit amount as shown in step 340. Also, the user's deposit account may be displayed as shown in step 342. Optionally, a list of possible deposit accounts may be shown to permit the user to select one more of these accounts to deposit the excess funds. In step 344, the user enters a confirmation that they wish to proceed and the dispense amount is dispensed by the machine as illustrated in step 346. Further, a transmission is sent to the host requesting that the excess funds be deposited as shown in step 348. The deposit transaction is then performed as shown in step 350. This may occur at the time of the transaction or may be batched and performed at a later time.

As shown in step 352, various data may be stored at the host to permit various statistical analyses to be performed. For example, the host may keep track of which ATMs run out of certain coins and/or certain bills. This may be particularly useful in high traffic locations where ATMs frequently run out of certain coinage or certain bills. Various statistical reports may be employed to let technicians know when such machines will need to be restocked.

The invention has now been described in detail for purposes of clarity and understanding. However, it will be appreciated that certain changes and modifications may be practiced within the scope of the appended claims.

What is claimed is:

1. A method for cashing a negotiable instrument at an automated teller machine (ATM) comprising a display screen, a data entry device, a receipt printer, a bill dispenser and a reader, the method comprising:
   reading information from a negotiable instrument using the reader;
   receiving a face amount of the negotiable instrument at the ATM from the data entry device;
   calculating with the ATM at least one possible dispense amount comprising a combination of bills that the ATM is capable of dispensing;
   determining with the ATM any associated remaining funds that the ATM is unable to dispense;
   determining with the ATM at least one deposit account where the remaining funds may be deposited;

displaying on the display screen the dispense amount, the remaining funds that the ATM is unable to dispense, and the deposit account where the remaining funds may be deposited;

receiving a confirmation from the data entry device to dispense the bills in the displayed dispense amount and to deposit the displayed remaining funds in the displayed deposit account;

dispensing the bills from the ATM using the bill dispenser; and transmitting an approval from the ATM to a host computer system to deposit the remaining funds into the deposit account.

2. A method as in claim 1, wherein the dispense amount is determined based at least in part on the lowest denomination of bill that the ATM is able to dispense.

3. A method as in claim 1, further comprising displaying on the display screen a message indicating the lowest denomination bill offered by the ATM along with a message that any excess funds will be deposited into the deposit account.

4. A method as in claim 1, further comprising printing a receipt indicating the amount of cash dispensed and the amount deposited into the deposit account.

5. A method as in claim 1, further comprising displaying on the display screen various options for depositing the funds.

6. A method as in claim 1, wherein the information read from the negotiable instrument is a MICR line having payor account information.

7. A method for cashing a negotiable instrument at an automated teller machine (ATM) comprising a display screen, a data entry device, a receipt printer, a bill dispenser and a reader, the method comprising:

reading information from a negotiable instrument using the reader;

receiving a requested cash back amount from the negotiable instrument at the ATM from the data entry device;

transmitting the requested cash back amount and the information read from the negotiable instrument to a host computer system;

determining at the host computer system whether the ATM is able to dispense the requested cash back amount;

if the ATM is unable to dispense the requested cash back amount in cash, determining with the host computer system which bill denominations that the ATM is able to dispense;

determining with the host computer system at least one possible dispense amount comprising a combination of bills that the ATM is able to dispense;

determining with the host computer system any associated remaining funds that the ATM is unable to dispense;

determining with the host computer system at least one deposit account where the remaining funds may be deposited;

transmitting to the ATM the dispense amount, the remaining funds that the ATM is unable to dispense, and a deposit account for the remainder of the requested cash back amount;

displaying on the display screen the dispense amount, the remaining funds that the ATM is unable to dispense, and the deposit account where the deposit amount may be deposited;

receiving a confirmation from the data entry device to dispense the bills in the displayed dispense amount and to deposit the deposit amount in the deposit account;

dispensing the bills from the ATM using the bill dispenser; and transmitting an approval from the ATM to the host computer system to deposit the remaining funds into the deposit account.

8. A method as in claim 7, wherein the requested cash back amount is the face amount stated on the negotiable instrument.

9. A method as in claim 7, wherein the ATM includes a coin dispenser, wherein the coin dispenser is unable to dispense coins, and wherein the host computer system is configured to determine the dispense amount based on the inability to dispense coins.

10. A method as in claim 7, wherein the ATM is configured to dispense only bills, and wherein the host computer system is configured to determine the dispense amount based on bill denominations that the ATM is capable of dispensing.

11. A method as in claim 10, wherein the dispense amount is determined based at least in part on the lowest denomination of bill held by the ATM.

12. A method as in claim 7, wherein if ATM is not able to dispense the requested cash back amount, denying a negotiable instrument cashing transaction and performing a deposit with a cash back transaction.

13. A method as in claim 7, wherein the dispense amount is based on a next highest denomination able for dispensing.

14. A method as in claim 7, further comprising displaying on the display screen a message indicating the lowest denomination bill offered by the ATM along with a message that any excess funds will be deposited into the deposit account.

15. A method as in claim 7, further comprising printing a receipt indicating the amount of cash dispensed and the amount deposited into the deposit account.

16. A method as in claim 7, further comprising displaying on the display screen various options for depositing the funds.

17. A method as in claim 7, wherein the information read from the negotiable instrument is a MICR line having payor account information.

18. A method as in claim 7, further comprising storing at the host computer system data on requested cash back amount along with the bills actually dispensed.

19. An automated teller machine (ATM) that is configured to provide a cash payment based on a negotiable instrument, comprising:

a housing;

a processor enclosed within the housing;

a reader electrically coupled to the processor that is configured to read information from a negotiable instrument;

a data entry device electrically coupled to the processor, wherein the data entry device is configured to receive a face amount of the negotiable instrument;

a display screen coupled to the housing, wherein the display screen is configured to display a calculated dispense amount, wherein the dispense amount comprises a combination of bills that the ATM is capable of dispensing, wherein the display screen is configured to display a calculated amount of remaining funds that the ATM is unable to dispense, and wherein the display screen is configured to display a deposit account where the remaining funds may be deposited;

wherein the data entry device is further configured to receive a confirmation from a user to dispense the bills comprising the dispense amount and to deposit the remaining funds in the deposit account;

a bill dispenser configured to dispense the bills from the ATM;

a receipt printer; and a communications device that is configured to transmit an approval from the ATM to a host computer system to deposit the funds into the deposit account.

20. An ATM as in claim 19, wherein the dispense amount is determined based at least in part on the lowest denomination of bill that the ATM is able to dispense.

21. An ATM as in claim 19, wherein the ATM is configured to display on the display screen a message indicating the lowest denomination bill offered by the ATM along with a message that any excess funds will be deposited into the deposit account.

22. An ATM as in claim 19, wherein the printer is configured to print a receipt indicating the amount of cash dispensed and the amount deposited into the deposit account.

23. An ATM as in claim 19, wherein the ATM is configured to display on the display screen various options for depositing the funds.

24. A system for cashing a negotiable instrument, the system comprising:
    an automated teller machine (ATM) comprising a display screen, a data entry device, a receipt printer, a bill dispenser and a reader; and
    a host computer system capable of communicating with the ATM;
    wherein the ATM is configured to read information from a negotiable instrument using the reader, to receive a requested cash back amount from the data entry device, and to transmit the requested cash back amount and the information read from the negotiable instrument to the host computer system;
    wherein the host computer system is configured to determine whether the ATM is able to dispense the requested cash back amount based on the bills that the ATM is capable of dispensing, and, if the ATM is unable to dispense the requested cash back amount in cash, to determine which bill denominations that the ATM is able to dispense and any remaining funds that the ATM is unable to dispense, and to transmit to the ATM a dispense amount that the ATM is able to dispense in bills and a deposit amount for the remainder of the requested cash back amount that the ATM is unable to dispense; and
    wherein the ATM is configured to display on the display screen the dispense amount along with a deposit account where the deposit amount may be deposited, to receive a confirmation from the data entry device to dispense the bills and to deposit the deposit amount in the deposit account, to dispense the bills from the ATM using the bill dispenser, and to transmit an approval from the ATM to the host computer system to deposit the funds into the deposit account.

25. A system as in claim 24, wherein the ATM includes a coin dispenser, wherein the coin dispenser is unable to dispense coins, and wherein the host computer system is configured to determine the dispense amount based on the inability to dispense coins.

26. A system as in claim 24, wherein the ATM is configured to dispense only bills, and wherein the host computer system is configured to determine the dispense amount based on bill denominations that the ATM is capable of dispensing.

27. A system as in claim 24, wherein the dispense amount is determined based at least in part on the lowest denomination of bill held by the ATM.

28. A system as in claim 24, wherein if ATM is not able to dispense the requested cash back amount, the host computer system is configured to deny a negotiable instrument cashing transaction and to instead perform a deposit with a cash back transaction.

29. A system as in claim 24, wherein the dispense amount is based on a next highest denomination able for dispensing.

30. A system as in claim 24, wherein the ATM is configured to display on the display screen a message indicating the lowest denomination bill offered by the ATM along with a message that any excess funds will be deposited into the deposit account.

31. A system as in claim 24, wherein the receipt printer is configured to print a receipt indicating the amount of cash dispensed and the amount deposited into the deposit account.

32. A system as in claim 24, wherein the ATM is configured to display on the display screen various options for depositing the funds.

33. A system as in claim 24, wherein reader is configured to read from the negotiable instrument a MICR line having payor account information.

* * * * *